Figure 1:
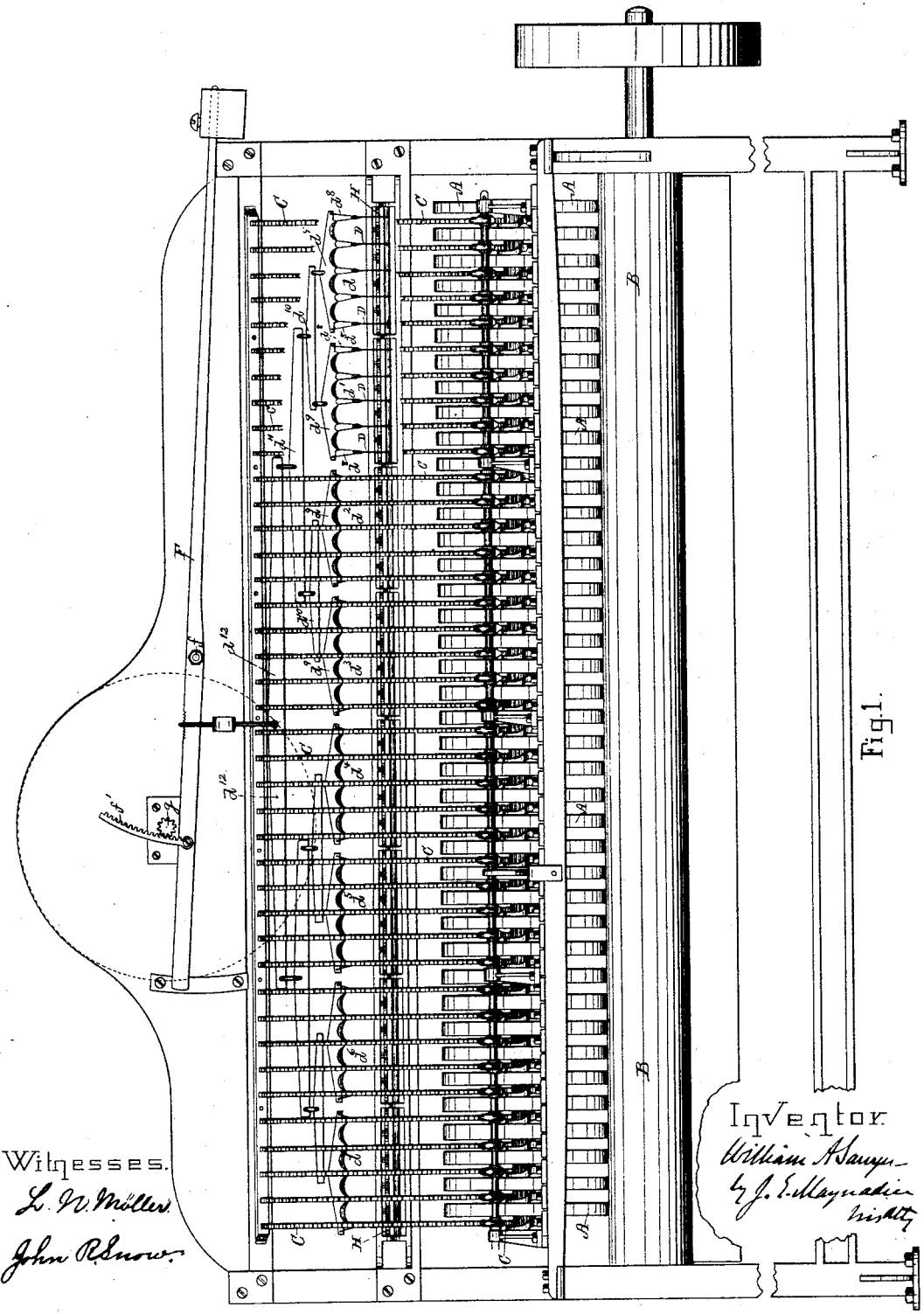

(No Model.) 3 Sheets—Sheet 1.

W. A. SAWYER.
MACHINE FOR MEASURING THE AREA OF SURFACES.

No. 286,078. Patented Oct. 2, 1883.

Witnesses.
L. W. Möller
John R. Snow.

Inventor.
William A. Sawyer
by J. E. Maynadier
his atty (No Model.)  3 Sheets—Sheet 2.
W. A. SAWYER.
MACHINE FOR MEASURING THE AREA OF SURFACES.
No. 286,078.  Patented Oct. 2, 1883.
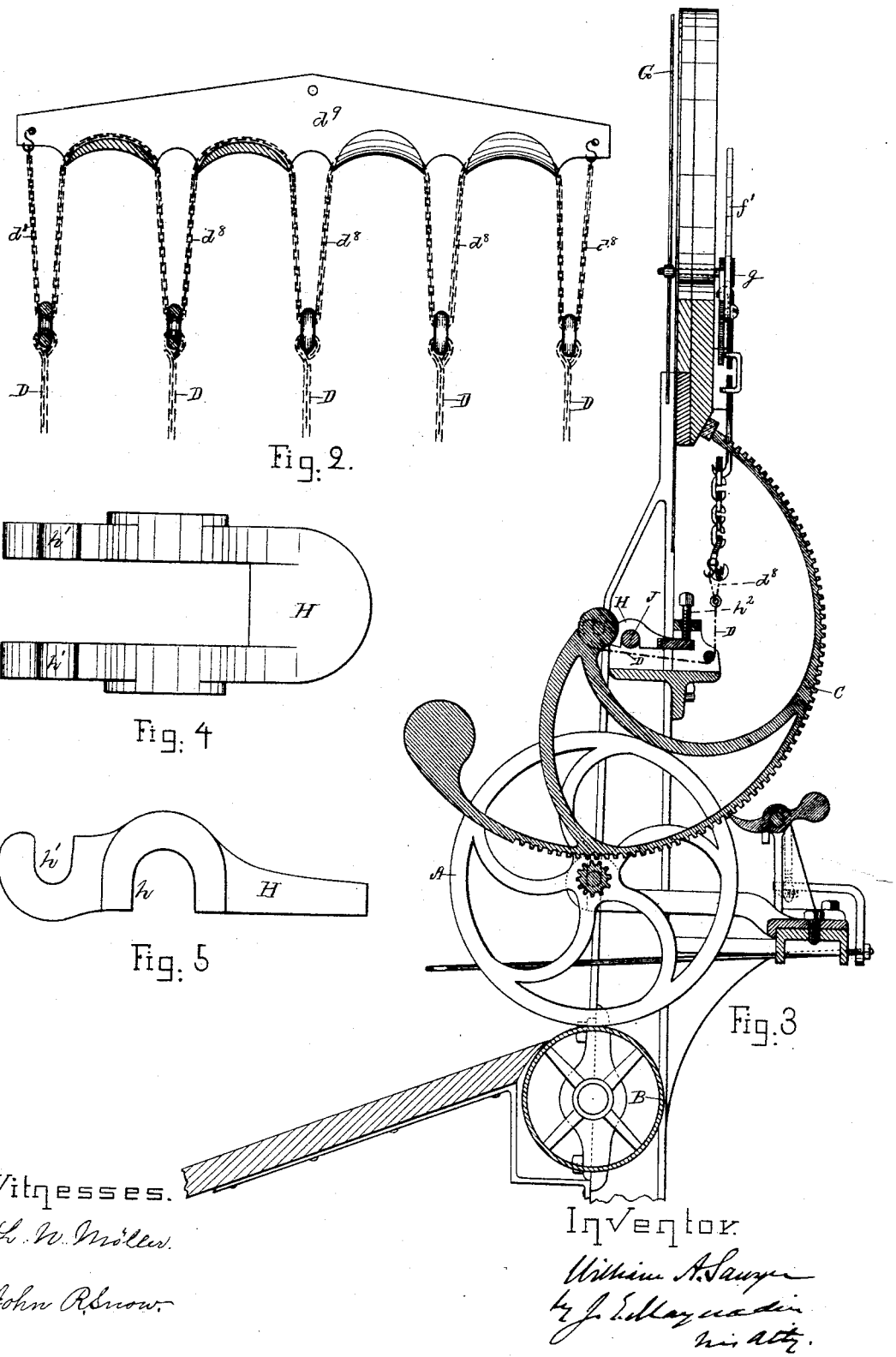

(No Model.) 3 Sheets—Sheet 3.
W. A. SAWYER.
MACHINE FOR MEASURING THE AREA OF SURFACES.
No. 286,078. Patented Oct. 2, 1883.

Witnesses.
L. W. Miller.
John R. Snow.

Inventor.
William A. Sawyer
by J. E. Maynadier
his atty

UNITED STATES PATENT OFFICE.

WILLIAM A. SAWYER, OF DANVERSPORT, ASSIGNOR OF TWO-FIFTHS TO ARTHUR B. CLAFLIN, OF NEWTONVILLE, MASSACHUSETTS.

MACHINE FOR MEASURING THE AREAS OF SURFACES.

SPECIFICATION forming part of Letters Patent No. 286,078, dated October 2, 1883.

Application filed February 23, 1883. (No model.)

*To all whom it may concern:*

Be it known that I, WILLIAM A. SAWYER, of Danversport, in the county of Essex and State of Massachusetts, have invented certain new and useful Improvements in Machines for Measuring the Areas of Surfaces, of which the following is a specification.

My invention relates to improvements in machines for measuring and registering the superficial area of sheets, (more especially those of irregular outline, such as hides and skins,) in which a greater or less number of a series of wheels revolving in contact with a roller are raised, according to the varying width of the article passing through, and each wheel, when so raised, actuates a device for winding up a cord or the like. The amount of cord wound by any one wheel indicates the number of inches of material that has passed under that wheel, and the measurements of all the wheels are aggregated and indicated by an index-finger and a graduated scale.

In machines of this class as first constructed the cords from all the winding devices were connected to one and the same cord, which cord actuated the index-finger of the scale. This arrangement was found objectionable on account of the friction caused by the great number of pulleys required and the difficulty with which the long cord rendered through them.

One object of this invention is to obviate these objectionable features; and my invention consists in an arrangement of levers by which the travel of each measuring-wheel is caused to properly affect the index of the registering device.

Another object of this invention is to provide facilities for readily removing or replacing any one of the series of wheels without interfering with the others. This I accomplish by supporting the parts, as fully described hereinafter.

The accompanying drawings illustrate so much of a machine of the class above mentioned as is deemed necessary to show my present improvements. This principle of measuring the area of surfaces embodied in machines of this class is new with me, and my former devices for carrying it out are described in Letters Patent No. 256,058, of 1882, and No. 269,962, of 1883.

Figure 6:
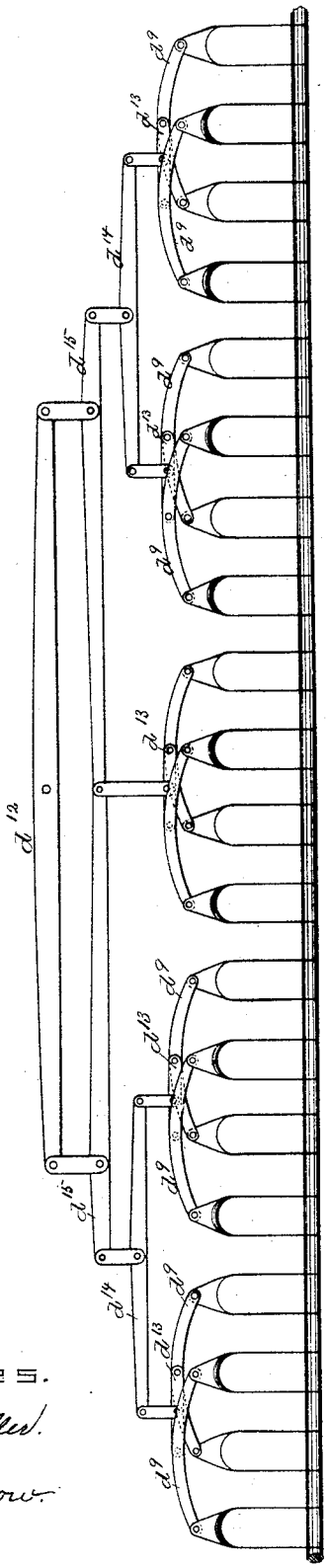
Figure 7:
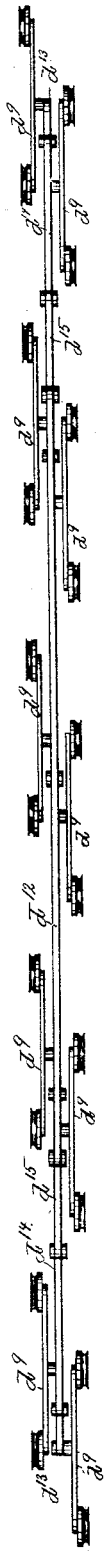

In the drawings, Figure 1 illustrates a partial rear elevation of one of my machines with my improvements embodied. Fig. 2 is a view, on a larger scale, of one set of five cords and their portions of the main cord, showing the connection with the system of levers. Fig. 3 is a partial cross-section, showing a novel way of supporting the toothed segments, so as to allow the removal of any one of the wheels without disturbing the others. Figs. 4 and 5 are details of the toothed-segment support. Figs. 6 and 7 are modifications of the system of levers.

The width of the machine depends upon the number of wheels, and varies for different purposes. In Fig. 1 is illustrated one of the largest size for measuring hides, and provided with forty wheels. In all, however, each wheel is a separate measuring-machine, so that each machine will measure widths varying from that of one wheel up to the total number of wheels. All the wheels A rest on a roller, B, which is revolved by any of the well-known means. Each wheel has a hub projecting slightly beyond its rim and side. Each projecting part of the hubs is toothed, and is placed immediately below a toothed segment, (marked C in Fig. 3.) To the hubs of each of these segments is attached a cord, D. When an article—such as a side of leather—is inserted between the wheels A and the roller B, a greater or less number of the wheels, according to the width of the article, will be raised, and their toothed hubs be caused to engage with the teeth of the segments C. As the article is drawn in by the revolution of the roller B, the wheels in contact therewith will rotate and cause the segments with which their hubs mesh to rotate and wind up the cord attached to their hubs, and the total length of cord so wound up will indicate the total area of the article that passed under the wheels. To aggregate the measurements of the cords by means of a series of levers, the cords may be divided into sets, as indicated by the letters $d, d', d^2, d^3, d^4, d^5, d^6$, and $d^7$ in Fig. 1. Each cord is secured at each end, $d^8$, to a small lever, $d^9$, but renders freely through rings or pulleys. Two of these small levers $d^9$ are pivoted at their center to the opposite ends of a lever, $d^{10}$, which may be pivoted at its center direct to a weighted arm, F, pivoted to the frame at $f$, and carrying a racked segment, $f'$, which, meshing with the pinion $g$, causes it to revolve when the arm F is moved. The index-finger G is fast to the shaft of the pinion $g$, and consequently moves with it. This arrangement would constitute a complete machine of ten wheels. For a complete machine of twenty wheels, two levers, $d^{10}$, each having two small levers, $d^9$, with their two sets of five cords, would be pivoted to the arms of a lever, $d^{11}$, which would be pivoted at its center to the weighted arm F. For the machine of forty wheels, (illustrated in Fig. 1,) two of the twenty-wheel connections above described are pivoted to the ends of a lever, $d^{12}$, which is pivoted at its center to the weighted arm F. By thus shortening the cords I am enabled to substitute for them small chains, which not only render freely and work perfectly, but are also much preferable on account of not being affected by moisture and of their greater durability. The toothed segments, cords, and levers being arranged as aforesaid, the same amount of displacement of any one or other member of the segments will cause the index-finger to move the same distance over the graduated scale. The movement of the index-finger is always exactly proportional to the number of segments displaced and the aggregate amount of their displacements—that is to say, in measuring a surface of one hundred and forty-four square inches area it would make no difference whether it were a strip one and a half inch wide and ninety-six inches long and rotated only one wheel during its passage, or whether it were a piece nine inches wide and sixteen inches long and rotated six wheels during its passage, or whether it were of varying widths in its length and rotated a different number of wheels according to its varying widths. The index-finger would in each case indicate the correct area.

It will be obvious that the arrangement of levers may be varied, the requirement being that the arrangement shall be such as to correctly aggregate the motion of every measuring-wheel. Thus in Figs. 6 and 7 I have shown the wheels in pairs, one cord from each pair extending round a pulley, and two of these pulleys on each small lever $d^9$. These small levers are connected in pairs by the levers $d^{13}$, and each pair of levers $d^{13}$ is connected by a lever, $d^{14}$, each lever $d^9$, in this case, being connected with four wheels—two at each end—each lever $d^{13}$ with eight wheels, and each lever $d^{14}$ with sixteen wheels, as shown in Fig. 6. Now, were there but thirty-two wheels in the machine, two levers $d^{14}$ would be connected—one at each end—with lever $d^{12}$; but if forty wheels be used, then each lever $d^{14}$ should be connected to a lever, $d^{15}$, and these two levers $d^{15}$ should be each connected with a lever $d^{13}$ connected with eight wheels to make up the forty, and as the levers $d^{15}$ have sixteen wheels at their outer ends and but eight wheels at their inner ends, or four for each lever $d^{15}$, the levers $d^{15}$ should each have an arm four times as long as the other arm.

In Figs. 3, 4, and 5 I have illustrated the new way of supporting the toothed segments C, so as to allow any one of them to be removed when required to take out or replace any one of the wheels without disturbing the others. The support H is provided with two half-boxes, $h\ h'$, one of which, $h$, serves to receive the cross-rod J, on which all of the supports H rest. The half-box $h'$ receives the journals of the toothed segment C, which is carried by the support H. It will be evident that with the parts so arranged any one of the segments and its support can be lifted out at pleasure and afford access to the wheel below. This arrangement is of much practical value, since in the machines as heretofore constructed the rod J passed through the supports H and the toothed segments were mounted on pins passing through them and secured in jaws formed on the ends of the supports, so that the whole had to be taken apart to replace a wheel. The supports are adjusted by means of set-screws $h^2$, so as to regulate the space between the toothed hubs of the wheels and the segments. This feature, however, and other details of the machine constitute no part of my present invention, and no further description is deemed necessary.

What I claim as my invention is—

1. In a machine for measuring the area of surfaces in which the area to be measured actuates devices for winding up cords, the combination of the registering device with the cords by means of levers connected and operating substantially as and for the purposes specified.

2. The combination, with a series of wheels having toothed hubs and a series of toothed segments located over these hubs, of supports for these segments having two half-boxes, as described, so that the segments and supports may be readily lifted from their bearings and allow access to the wheels, substantially as and for the purposes set forth.

WILLIAM ARTHUR SAWYER.

Witnesses:
W. A. COPELAND,
J. R. SNOW.